United States Patent [19]

Curley, Jr. et al.

[11] Patent Number: 4,984,320
[45] Date of Patent: Jan. 15, 1991

[54] SHOE SOLE EMBOSSED COMPOSITION AND METHOD

[75] Inventors: John J. Curley, Jr., Dunstable, Mass.; Jui-Chiung Yang; Tzu-Hung Yeh, both of Taichung, China

[73] Assignee: Foot-Joy, Inc., Brockton, Mass.

[21] Appl. No.: 338,915

[22] Filed: Apr. 17, 1989

[51] Int. Cl.⁵ .................... A43B 5/00; A43C 15/16
[52] U.S. Cl. .................... 12/146 BR; 12/142 P; 36/127
[58] Field of Search ............... 36/127, 128, 129, 134, 36/14; 12/142 P, 146 B, 146 BR

[56] References Cited

U.S. PATENT DOCUMENTS

| | | | |
|---|---|---|---|
| 2,071,298 | 2/1937 | Dunbar | 36/14 |
| 2,651,118 | 9/1953 | Root | 36/14 |
| 3,738,026 | 6/1973 | Granger | 36/127 |
| 3,739,499 | 6/1973 | Morin | 12/142 P |
| 4,335,528 | 6/1982 | Watanabe | 36/127 |
| 4,580,359 | 4/1986 | Kirrash et al. | 36/127 |
| 4,742,626 | 5/1988 | Tadiotto | 36/127 |
| 4,794,707 | 1/1989 | Franklin et al. | 36/30 R |

FOREIGN PATENT DOCUMENTS

| | | | |
|---|---|---|---|
| 0015077 | 1/1983 | Japan | 36/134 |
| 2092881 | 8/1982 | United Kingdom | 36/127 |

*Primary Examiner*—Steven N. Meyers
*Attorney, Agent, or Firm*—Pennie & Edmonds

[57] ABSTRACT

A shoe sole lamination and method of lamination in which shoe sole portions composed of selected materials and low melting plastic inserts are laminated and then heat embossed. The method includes use of insulating inserts placed strategically in the mold to protect the plastic inserts against the heat and temperatures of embossing.

11 Claims, 3 Drawing Sheets

SHOE SOLE EMBOSSED COMPOSITION AND METHOD

BACKGROUND OF THE INVENTION

Prior shoe soles for walking and athletic shoes having insert plates for mounting removable spikes have included shoe sole portions composed of polyurethane polymers which materials could be embossed by molding to create surface designs at low temperatures in the range of 100°-120° F. Soles made of such material are relatively heavy compared with soles made of lighter material such as ethylene-vinyl acetate; however, such lighter weight material has a moldable heat range above the softening point of the insert plate material such as Delrin brand acetal material.

No satisfactory method of molding the lighter weight higher molding temperature material in insert-carrying soles has previously been available to the industry.

SUMMARY OF THE INVENTION

Broadly, the present invention is a composite shoe sole including a multiple layered laminate having a lowermost portion of ethylene-vinyl acetate and butadiene rubber and an intermediate portion consisting of a low-melting-point sole insert. The lowermost sole portion is mold embossed in a heatable mold. The lowermost sole portion has at least one aperture therein which aperture receives an insulating mold plug during heat embossing to insulate the sole insert from mold heat. The top mold plate or lid may also have an insulating portion to protect the sole insert from heat which may penetrate the uppermost laminate layer.

Features of the embossed composite and the producing method are that the sole is lighter, requires no adherent release agent, and the plastic sole insert is not damaged during the embossing in the mold.

DESCRIPTION OF THE PREFERRED EMBODIMENTS OF THE INVENTION

Figure 1:
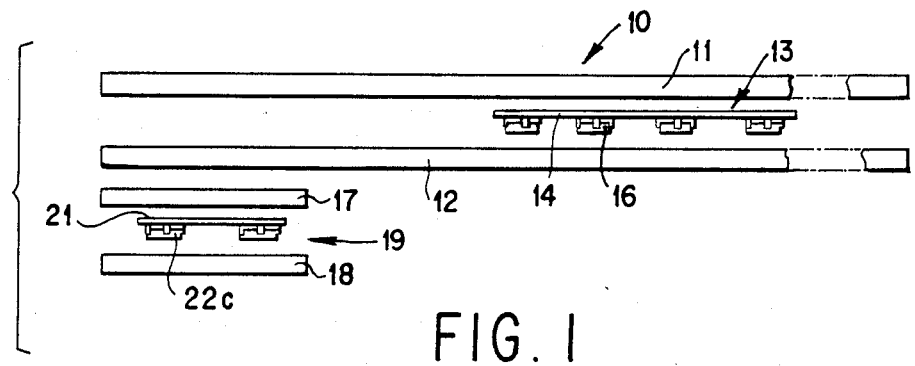
FIG. 1 is an exploded side elevational view of the sole components and inserts.
Figure 2:
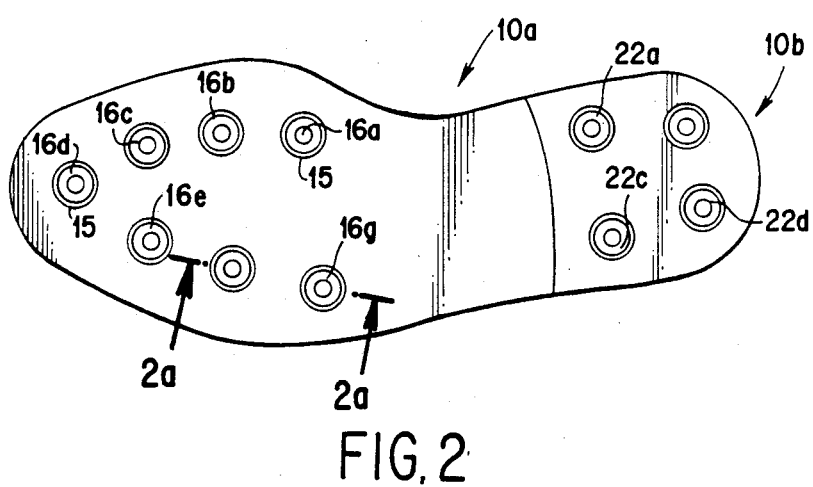
FIG. 2 is a bottom view of the sole composition with components assembled and about to be compressed attached by adhesive and readied for embossing.
Figure 3:
FIG. 3 is a side elevational view of the composite of FIG. 2 after compression and attachment by adhesive.
Figure 2A:
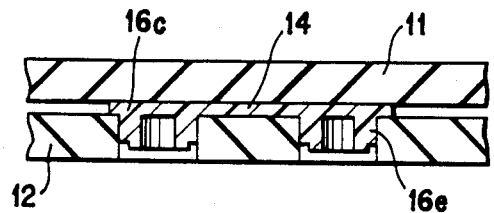
FIG. 2a is a sectional view along line 2a-2a of FIG. 2.

In FIGS. 1-3, shoe sole composite 10 includes upper sole portion 11, lower sole portion 12, sole plastic insert 13 including sole insert plate 14 with seven (7) sockets 16a-16g. Sockets 16 are functioned to receiVe removable spikes (not shown). Lower sole portion 12 carries holes 15 to accommodate sockets 16. Portions 11, 12 and insert 13 are assembled, compressed and held together with adhesive to create the full sole section 10a. Composite 10 also includes upper heel portion 17, lower heel portion 18 and heel insert 19 including heel plate 21 and four (4) heel sockets 22a-d. Lower heel portion has holes 20 to accommodate sockets 22. The heel portion 17,18 and insert 19 are assembled compressed and held together with adhesive to form heel section 10b (FIG. 3). FIG. 2a depicts the assemblage of elements prior to compression.

Figure 5:
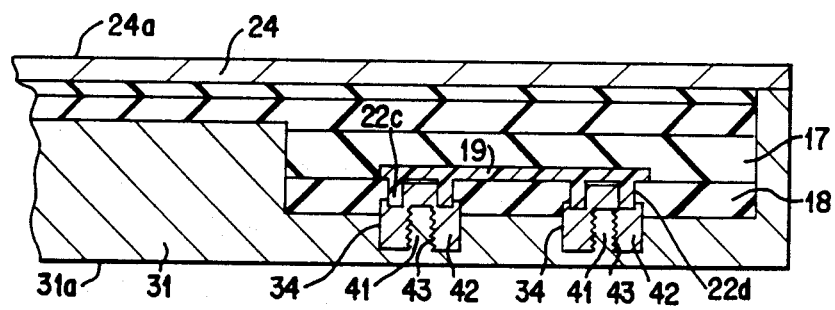
FIG. 5 is a partial sectional view through the sole heel of the composite in the closed mold.
Figure 4:
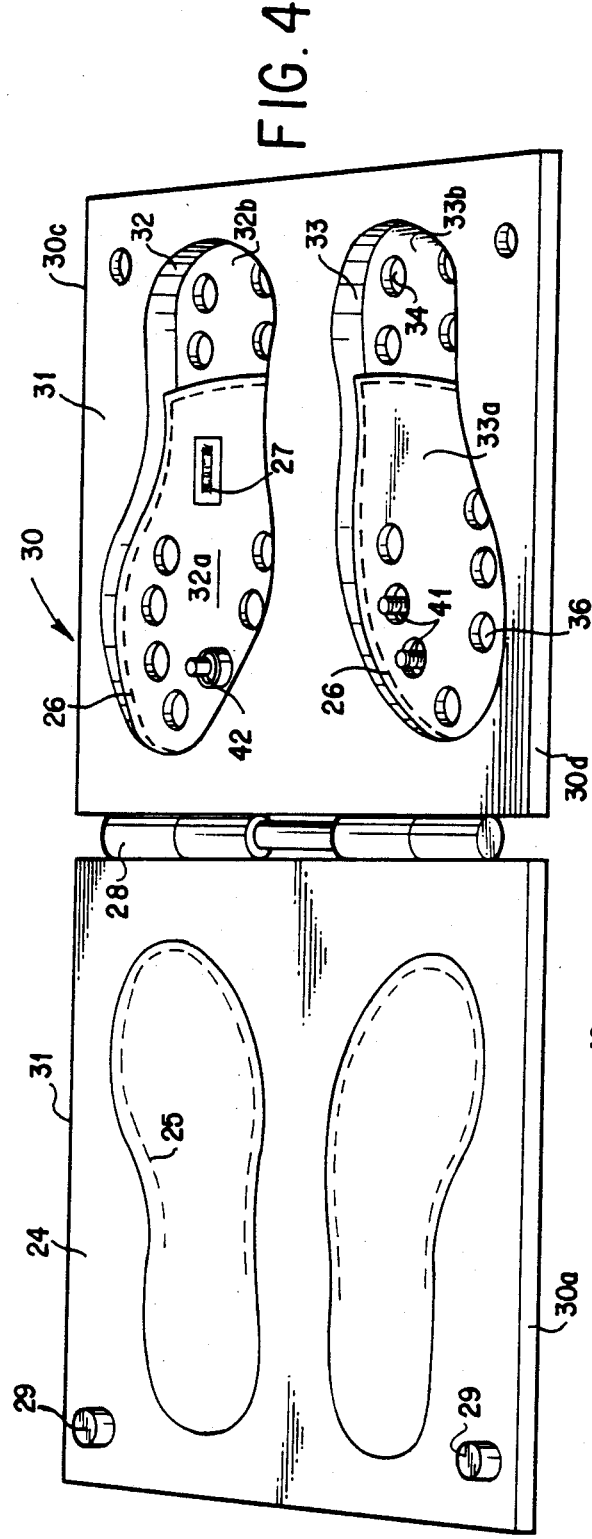
FIG. 4 is a perspective view of the open mold.

Turning to FIGS. 4 and 5, mold 30 includes mold base plate 31 with right and left cavities 32, 33 respectively. Also shown is mold lid 24 embossing pattern 25 for embossing the top side of the sole, the embossing pattern 26 for embossing the bottom of sole and the logo embosser 27. Also shown is the mold hinge 28 and the alignment pins 29. When closed mold 30 exterior sides include mold edges 30a-d together with the larger exterior surfaces 31a, 24a of base plate 31 and lid 24, respectively (FIG. 5). Each cavity 32, 33 has a sole floor 32a, 33a and heel floors 32b, 33b. Each cavity 32, 33 has holes 34 in the heel-receiving portions 32b, 33b and holes 36 in the sole-receiving portion 32a,33a corresponding in position to the socket locations in the lower sole portion 18. Within each hole 34, 36 is a threaded post 41 for receiving an insulated plug 42 (for illustration purposes only examples of such post 41 and plug 42 are shown). Plug 42 has threaded interior apertures 43 (see FIG. 5) so that each plug 42 can be threaded on its post 41.

Figure 6:
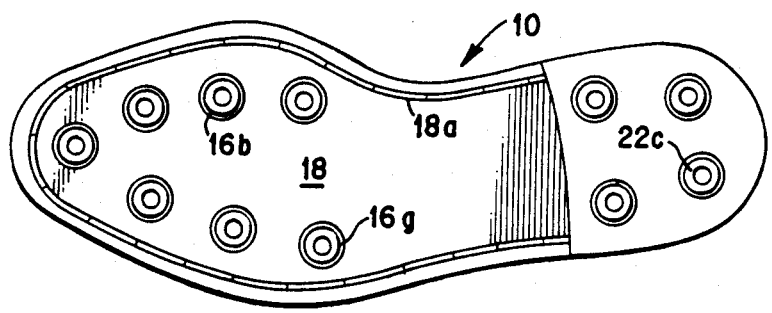
FIG. 6 is a bottom view of the embossed composite sole.
Figure 4A:
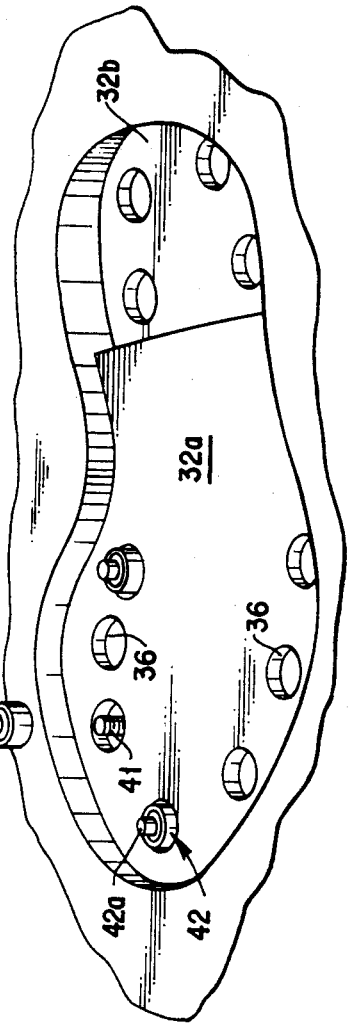
FIG. 4a is a partial and enlarged view of FIG. 4.

Turning in particular to FIG. 5, this sectional view taken through the heel and particularly through the centers of two of the sockets 22c,22d shows insulated plugs 42 positioned on threaded posts 41 upstanding in holes 34. Plugs 42 upper cylindrical heads 42a fit into sockets 22c,d (see FIG. 4a). Also shown is insert plate 19, heel layer portions 17 and 18, mold base plate 31 and mold lid 24. FIG. 6 shows the embossed sole composite 10 including lower sole portion 18 and embossing 18a.

Figure 7:
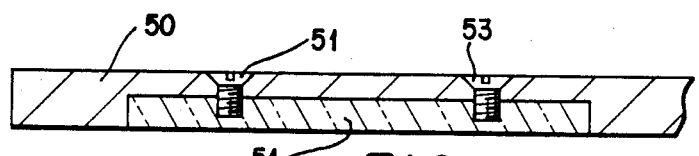
FIG. 7 is a partial sectional view of an alternative mold lid with insulation insert.

Finally, in FIG. 7 an alternative mold lid 50 is shown with an insulating panel or plug 51 recessed in it. Plug 51 is held in place by bolts 52, 53. The width, breadth and size of plug 51 and its location above insert 13 when lid 24 is closed is such that plug 51 insulates sole plastic insert 13 from excess heat that might otherwise penetrate through upper sole portion 11 (FIG. 1). Since the heel area has layers 11, 12 and 17 to protect it, plug 51 or other insulating plug to protect heel plate 21 have not been found necessary under usual process conditions.

EXAMPLE 1

The following composition was mixed in a suitable container which provides temperatures, pressures and other conditions for admixing and polymerization:

| | |
|---|---|
| 80 lbs. | of ethylene-vinyl acetate copolymer |
| 20 lbs. | of butadiene rubber |
| 100 lbs. | Total |

The rubber component serves to increase hardness and strengthen elasticity of the end product while adding hardness. Rubber may be added in the range of 0-40%.

The composition after polymerization was placed in a suitable mold (not shown) and after solidification was cut into shoe sole components including lower sole portion 12, upper sole portion 11 and lower and upper heel portions 17, 18. The lower sole and heel portions had apertures formed in them to receive the sockets 16 and 22 of the inserts 13 and 19. A pair of lower and upper soles were stacked with a sole insert sandwiched between them and thereafter partially compressed and then secured together using a suitable adhesive. Simultaneously, the heel portion with a heel insert were assembled, compressed and glued to the sole to form a completed sole composite including heel (see FIG. 1).

A hinged metal mold 30, about 14 inches by 16 inches by 4 inches when closed was employed for heating and embossing the sole composite's outer skin to form embossed upper and lower patterns thereon. The mold was first equipped with insulating plugs 42 threaded on posts 41 in selected hole locations on the mold cavity floor which plugs are sized to extend upwardly through the sole and heel apertures 15, 20 and to reside in and against sockets 16, 22 when the mold is closed. Plugs 42 are composed of a mixture of polyester resin and fiberglass and sulfur to provide heat insulation and strength. The plugs may also be made of phenol resins or other phenolic compounds.

The adhered composite was placed in mold 30, then at room temperature and with plugs 42 in the described positions. Next one or more of the sides of the mold was subjected to a temperature of about 270° F. for about six (6) minutes using electrically heated top and bottom mold press plates. At the beginning of this heating period, the temperature of the inside of mold 30 reached in about one minute the heating temperature of 270° F. while the insulating mold insert plugs 42 remain at or near room temperature thereby establishing a temperature differential between the plastic inserts 13 and 19 in the composite and the outer surfaces of mold. The insulating plugs 42 retarded heat transfer to the plastic inserts 13 and 19 during the heating period.

During this process the outer layer of the shoe composite is positioned between plugs 42 and surfaces of the molds 30a–d which layer reaches a temperature adequate to permit embossing formation before the inserts reach their softening point. Inserts made of materials which soften and/or shrink at temperatures as low as 110°–120° F. and melt at 175° F. were properly protected from mold heat by the insulating plugs.

After the period of heating was completed, the mold was then cooled with water to reduce the outside temperature. Some of the cooling water entered the mold to function as a mold release agent.

The mold 30 can be made of steel, aluminum, or other material. For a given shoe sole of particular size and material, the mold material, size, temperature applied, time, plug material and size, heating and other variables should be controlled to (1) raise the embossable skin areas of the sole composition to proper temperature without (2) permitting the temperature of the plastic inserts to raise to a level that the inserts are softened or otherwise adversely effected. Sockets of the insert are adversely effected if their threads or walls are distorted thereby making threaded installation of spikes difficult.

EXAMPLE 2

The following composition was mixed in a suitable container:

| | | |
|---|---|---|
| 80 lbs. | ethylene-vinyl acetate copolymer | (72.7% by wt) |
| 20 lbs. | butadiene rubber | (18.2% by wt) |
| 5 lbs. | dioctyl adipate | (4.5% by wt) |
| 5 lbs. | $ZnO_2$ | (4.5% by wt) |
| 110 lbs. Total | | |

The dioctyl adipate component serves to increase heat resistance and cold endurance of the end product while the $ZnO_2$ were added to accelerate polymerization including cross-linking.

The same steps as set out in Example 1 were then followed with satisfactory results.

EXAMPLE 3

The following composition was mixed in a suitable container:

| | |
|---|---|
| 80 lbs. | ethylene-vinyl acetate copolymer |
| 20 lbs. | polybutadiene rubber |
| 4 lbs. | high abrasion ferrous carbon black |
| 6 lbs. | intermediate SAF carbon black |
| 2.5 lbs. | active zinc oxide |
| 0.2 lbs. | $ZnO_2$ dimethyl diamide carbonate |
| 0.8 lbs. | curing agent |
| 0.6 lbs. | stearic |
| 0.2 lbs. | antioxidant B.H.T. |
| 3 lbs. | blowing agent |
| 0.1 lbs. | dioctyl phthalate |
| 0.1 lbs. | dioctyl phthalate |
| 117.5 lbs. | |

The same steps of Example 1 were then followed with satisfactory results.

We claim:
1. A shoe sole construction formed and treated using a method comprising
   a. laminating together
      i. a shaped upper sole portion of ethylene-vinyl acetate and butadiene rubber;
      ii. a shaped lower sole portion of ethylene-vinyl acetate and butadiene rubber having at least one aperture therein;
      iii. a low-melting point plastic insert positioned intermediate of the sole portions including a planar member and a socket element extending generally perpendicular from the planar member and located to extend into said lower portion aperture; the upper and lower sole portions being laminated together using pressure and an adhesive to form a laminate having an exterior skin portion;
   b. selecting a mold having exterior sides and an interior cavity for heating and cooling therein by heating the exterior sides and thereafter cooling the exterior sides;
   c. placing in the mold cavity a plug of insulating material to retard heat transfer from the mold exterior side to said plastic insert; and
   d. introducing the laminate into the mold with the insulating plug positioned between the mold exterior and the plastic insert
whereby the mold heating with insulation plug so positioned is controlled to prevent raising the temperature of the plastic insert above a point where such insert becomes damaged while permitting embossing of the exterior skin portion of the laminate.

2. The shoe sole construction formed and treated in accordance with the method of claim 1 in which also introduced in the mold is an insulating plug to protect the sole plastic insert.

3. The shoe sole construction of claim 1 in which sole portions also include dioctyl adipate of about four and one-half percent by weight.

4. The shoe sole construction of claim 1 in which one of said sole portions is composed of between about sixty (60) percent by weight and about one hundred (100) percent ethylene-vinyl acetate and between about zero (0) percent and about forth (40) percent butadiene rubber.

5. A method of heat embossing a shoe sole laminate having a low melting point socket bearing insert therein comprising
   a. constructing the shoe sole laminate of an upper layer of material and lower layer of material which is capable of being embossed at a high temperature, which lower layer has a lower surface for engaging a mold and an upper surface for engaging such socket bearing insert and such lower layer having a hole therein which communicates with both the lower surface and such insert wherein the laminate includes the upper layer, lower layer and such insert therebetween;
   b. selecting a heatable mold having an internal cavity which cavity has an embossing pattern and a cavity floor and a plug selectively placed on the floor with a potion protruding above the floor;
   c. placing the laminate in the mold cavity with the plug positioned in the lower layer hole; and
   d. compressing and heating the laminate in the mold to compress the laminate and emboss the laminate.

6. The method according to claim 5 in which the laminate is slightly larger than the mold cavity.

7. The method according to claim 5 in which the insulated plug is composed of a mixture of polyester resins and fiberglass.

8. The method according to claim 5 in which the plug includes a sulfur compound.

9. The method of claim 5 in which one of the layers includes ethylene-vinyl acetate and butadiene rubber.

10. The method of claim 5 in which the plug is composed of a mixture of polyester resins and fiberglass.

11. The method of claim 5 in which the plug includes a sulfur compound.

* * * * *